United States Patent [19]

Ito et al.

[11] Patent Number: 4,963,614

[45] Date of Patent: Oct. 16, 1990

[54] PRIMER COMPOSITION FOR GLASS

[75] Inventors: Masahiro Ito, Mishima; Shingo Tsuno, Sakai, both of Japan

[73] Assignee: Sunstar Giken Kabushiki Kaisha, Osaka, Japan

[21] Appl. No.: 441,643

[22] Filed: Nov. 27, 1989

[30] Foreign Application Priority Data

Nov. 28, 1988 [JP] Japan .................................. 63-302017

[51] Int. Cl.$^5$ ................................................ C08K 3/04
[52] U.S. Cl. ..................................... 524/495; 524/188; 524/262; 524/265
[58] Field of Search ................. 524/495, 262, 265, 188

[56] References Cited

U.S. PATENT DOCUMENTS 4,496,611  1/1985  Kawakubo et al. ................. 523/435
4,820,751  4/1989  Takeshita et al. ................... 524/495

*Primary Examiner*—Joseph L. Schofer
*Assistant Examiner*—R. H. Delmendo
*Attorney, Agent, or Firm*—Wegner & Bretschneider

[57] ABSTRACT

Primer composition for glass comprising a silane coupling agent, a reaction product of a polyisocyanate and a silane compound, a film-forming agent, and an acidic carbon black having pH 2.5 to 4. Said primer composition has extremely high weatherability and is useful as a primer for glass, particularly for applying to window glass of automobiles.

4 Claims, No Drawings

PRIMER COMPOSITION FOR GLASS

This invention relates to a primer composition for glass, more particularly, to a primer composition suitable for an adhesive for window glass of automobiles which requires extremely high weatherability against light, which is characterized in that an acidic carbon black of pH 2.5 to 4 is incorporated into a primer composition comprising a silane coupling agent, a reaction product of a polyisocyanate with various silanes, and a film-forming agent.

PRIOR ART

As a primer for adhesive for window glass of automobiles, there is known a primer composition comprising a silane coupling agent selected from reaction products of an epoxysilane and another silane compound; a reaction product of a polyisocyanate and various silane compounds; and a film-forming agent, and also being incorporated with carbon black or pigments, inorganic fillers (e.g. titanium oxide, calcium carbonate, silicic anhydride, etc.), which has excellent stability and excellent workability and also has excellent weatherability against light (cf. Japanese Pat. Second Publication (Kokoku) No. 33318/1982). However, there has never been found a primer composition having extremely high weatherability, for example, a primer having sufficient adhesion even under irradiation with sunshine weatherometer for 4,000 hours or longer, and there has been desired such an excellent primer composition.

BRIEF DESCRIPTION OF THE INVENTION

The present inventors have intensively studied as to an improved primer composition having such an extremely high weatherability, and have found that when an acidic carbon black having a specific pH range is used, there can be obtained the desired primer composition having an extremely high weatherability.

An object of this invention is to provide an improved primer composition for glass which has extremely high weatherability against light. Another object of the invention is to provide a primer composition suitable for adhesion for window glass of automobiles which is incorporated with an acidic carbon black having a specific pH range. These and other objects and advantages of the invention will be apparent to those skilled in the art from the following description.

DETAILED DESCRIPTION OF THE INVENTION

The primer composition for glass of this invention comprises a silane coupling agent, a reaction product of a polyisocyanate and a silane compound, a film-forming agent, and an acidic carbon black having pH 2.5 to 4.

The silane coupling agent used in this invention includes epoxysilanes [e.g. γ-glycidoxypropyltrimethoxysilane, γ-glycidoxypropylmethyldimethoxysilane, 3,4-epoxycyclohexylethyltrimethoxysilane, 3,4-epoxycyclohexylethylmethyldimethoxysilane, etc.]; silane compounds having a functional group reactive with an epoxy group (e.g. hydroxy group, amino group, imino group, mercapto group) such as aminomethyltriethoxysilane, N-(β-aminoethyl)aminomethyltrimethoxysilane, aminomethyldiethoxysilane, N-(β-aminoethyl)methyltributoxysilane, γ-aminopropyltriethoxysilane, γ-aminopropylmethyldiethoxysilane, γ-aminoisobutyltrimethoxysilane, γ-mercaptopropylmethyldimethoxysilane, γ-mercaptopropyltrimethoxysilane, γ-mercaptopropylmethyldiethoxysilane, γ-mercaptopropyltriethoxysilane, γ-mercaptopropylethyldimethoxysilane, γ-mercaptopropylethyldiethoxysilane, γ-mercaptopropyldimethylmethoxysilane, β-mercaptoethylmethyldimethoxysilane, β-mercaptoethyltrimethoxysilane, β-mercaptoethyltriethoxysilane, N-bis(β-hydroxyethyl)-γ-aminopropyltriethoxysilane, N-(β-aminoethyl)-γ-aminopropyltrimethoxysilane, N-(β-aminoethyl)-γ-aminopropylmethyldimethoxysilane, N-(β-aminoethyl)-γ-amino-β-methylpropyltrimethoxysilane, and the like. Particularly, it is preferable to use a silane coupling agent which is prepared by reacting 1 mole of the above epoxysilane with 0.3 to 1 mole of the above silane compound having a functional group reactive with an epoxy group.

The reaction product of a polyisocyanate with a silane compound includes, for example, the reaction products prepared by reacting 1 mole of a polyisocyanate with 0.1 to 1 mole of a silane compound having a functional group reactive with an isocyanate group (e.g. hydroxyl group, amino group, imino group, mercapto group, or epoxy group) for example, the above epoxysilanes or silanes to be reacted with epoxysilanes). Preferred examples of the polyisocyanate are tetramethylenediisocyanate, trimethylhexamethylenediisocyanate, hexamethylenediisocyanate, isophoronediisocyanate, lysinediisocyanate methyl ester, tolylenediisocyanate, Desmodur N (manufactured by Bayer A.G.), Colonate HL (manufactured by Nippon Polyurethane K.K.), diphenylmethanediisocyanate, naphthylenediisocyanate, xylylenediisocyanate, triphenylmethanetriisocyanate, tris(4-phenylisocyanate)thiophosphate, and hydrogenated products thereof, and various adducts.

The film-forming agent used in this invention includes, for example, polyester resins, chlorinated rubber, polyvinyl chloride resins, polyacrylate resins, epoxy resins, silicone resins, ethylene-vinyl acetate copolymer, and the like.

The carbon black used in this invention is characteristic in that it has a pH 2.5 to 4. When the pH range of the carbon black is less than 2.5, the primer composition incorporated therewith has significantly lower storage stability and further it is difficult to disperse the carbon black into the composition. On the other hand, when the pH range is larger than 4, the primer composition can not show the desired extremely high weatherability, and further, when it is applied to glass, the formed film of the primer is dissolved with the plasticizer and/or solvent contained in the urethane adhesives (or sealants), or occasionally there is observed interfacial failure between the glass and the film layer of the primer. The acidic carbon black has preferably a particle size of 10 to 30 nm.

The primer composition for glass of this invention is prepared by dissolving the above silane coupling agent, a reaction product of a polyisocyanate with a silane compound and a film-forming agent in an appropriate organic solvent, such as ketones (e.g. methyl ethyl ketone, acetone, etc.), esters (e.g. ethyl acetate, butyl acetate, etc.), ethers (e.g. diethyl ether, tetrahydrofuran, dioxane, etc.), aromatic hydrocarbons (e.g. toluene, xylene, benzene, etc.), and the like, and thereto adding and dispersing an acidic carbon black having a pH 2.5 to 4, optionally further a slight amount of a tin catalyst (e.g. dibutyl tin dilaurate). The silane coupling agent, the reaction product of a polyisocyanate and a silane compound, and the film-forming agent are incorporated in an amount of 20 to 40 parts by weight, 5 to 30 parts by weight, and 5 to 30 parts by weight, respectively. The primer composition may optionally be incorporated with a small amount of conventional dehydrating agents, plasticizers, and the like. The acidic carbon black is usually incorporated in an amount of 2 to 10 % by weight, preferably 4 to 8 % by weight, based on the total weight of the composition. When the amount of the acidic carbon black is less than 2 % by weight, the desired extremely high weatherability can not be achieved, but on the other hand, when the amount is over 10 % by weight, the primer composition has a high viscosity and hence tends to show increased viscosity, which results in less workability.

This invention is illustrated by the following Examples, but should not be construed to be limited thereto.

EXAMPLES 1 TO 3 AND REFERENCE EXAMPLES 1 to 4

(1) Preparation of primer compositions for glass:

| Components | Part by weight |
|---|---|
| A reaction product of γ-(2-aminoethyl)aminopropylmethyldimethoxysilane (KBM-602, manufactured by Shin-Etsu Chemical Co., Ltd.) and γ-glycidoxypropyltrimethoxysilane (KBM-403, manufactured by Shin-Etsu Chemical Co., Ltd.) (as a silane coupling agent) | 27 |
| A reaction product of trimethylolpropane adduct of hydrogenated xylylenediisocyanate (Takenate D-120N, manufactured by Takeda Chemical Industries, Ltd.) and γ-mercaptopropyltrimethoxysilane (as a reaction product of a polyisocyanate with a silane) | 7 |
| Polyacrylate resin (as a film-forming agent) | 7.5 |
| Methyl ethyl ketone | 52 |
| Carbon black (pH as shown in Table 1) | 6.5 |

By using the above components, the composition is prepared in the following manner.

Firstly, the silane coupling agent and the reaction product of a polyisocyanate and a silane are charged into a sealed vessel under $N_2$ gas, and thereto is added the polyacrylate resin and methyl ethyl ketone, and the mixture is uniformly mixed with stirring. To the mixture is added dry carbon black as shown in Table 1, and the mixture is dispersed with a ball mill for 10 to 20 hours.

(2) Test of weatherability:
The following tests (i) and (ii) were done.
(i) Crosscut test on a primer film:

The primer composition prepared in the above (1) was applied to a degreasing regular glass plate and the plate was allowed to stand at room temperature for 24 hours to form a film of the primer. The film of primer was irradiated with a sunshine weatherometer (manufactured by Suga Kikai K.K., black panel temperature, 83°C.), and thereafter, the film of primer was crosscut with a knife (total 100 squares) and thereon a cellophane tape was applied. The adhesion of the primer film was evaluated by the number of squares peeled off [number of squares peeled off/100 (total number of squares)]when the tape was peeled as follows:

100/100: It means that no primer film was peeled off together with the tape when it was peeled.

0/100: It means that all squares of the primer film were peeled off together with the tape due to the material failure.

The test results are shown in Table 1.

(ii) Adhesion between primer film and adhesive:

The primer composition prepared in the above (1) was applied to a degreasing regular glass plate and the plate was allowed to stand at room temperature for 2 hours, and thereon a one-pack urethane adhesive (Betaseal #551, manufactured by Sunstar Giken K.K.), was applied and then the plate was allowed to stand at room temperature for 7 days to cure the adhesive. The plate was irradiated with a sunshine weatherometer for a prescribed period of time, and was subjected to a test of adhesion, i.e. a knife-cut peeling test at 18°. The result is shown in Table 1 wherein "CF" means cohesive failure of the adhesive, and "AF" means interfacial failure between the glass and the primer film.

TABLE 1

| | Examples | | | Reference Examples | | | |
|---|---|---|---|---|---|---|---|
| | 1 | 2 | 3 | 1 | 2 | 3 | 4 |
| Carbon black | *1 | *2 | *3 | *4 | *5 | *6 | *7 |
| pH | 3 | 2.7 | 2.5 | 5 | 7 | 8.5 | 9 |
| particle size (nm) | 25 | 20 | 17 | 29 | 15 | 75 | 27 |
| (i) Tape peeling test | | | | | | | |
| 1,000 hours | 100/100 | 100/100 | 100/100 | 100/100 | 100/100 | 100/100 | 100/100 |
| 2,000 hours | " | " | " | 90/100 | 85/100 | 80/100 | 85/100 |
| 4,000 hours | " | " | " | 45/100 | 40/100 | 50/100 | 55/100 |
| 6,000 hours | " | " | " | 30/100 | 25/100 | 45/100 | 40/100 |
| (ii) Peeling at 180° | | | | | | | |
| 1,000 hours | CF | CF | CF | CF | CF | CF | CF |
| 2,000 hours | " | " | " | 5% AF | 10% AF | 10% AF | 5% AF |
| 4,000 hours | " | " | " | 30% AF | 25% AF | 30% AF | 35% AF |
| 6,000 hours | " | " | " | 40% AF | 35% AF | 35% AF | 40% AF |

*1 SPECIAL BLACK 4 (manufactured by Degussa)
*2 SPECIAL BLACK 5 (manufactured by Degussa)
*3 SPECIAL BLACK 6 (manufactured by Degussa)
*4 PRINTEX 105T (manufactured by Degussa)
*5 MONARCH 900 (maufactured by Cabot)
*6 STERLING R (maufactured by Cabot)
*7 ELFTEX 8 (maufactured by Cabot)

What is claimed is:
1. A primer composition for glass which comprises a silane coupling agent selected from the group consisting of epoxysilanes and silane compounds having a functional group active to an epoxy group, a reaction product of a polyisocyanate and a silane compound having a functional group active to an isocyanate group, a film-forming agent, and 2% to 10% by weight, based on the total weight of the composition, of an acidic carbon black having pH 2.5 to 4 in admixture with a conventional organic solvent.

2. The primer composition according to claim 1, wherein the silane coupling agent, the reaction product of a polyisocyanate and a silane compound, and the film-forming agent are incorporated in an amount of 20 to 40 parts by weight, 5 to 30 parts by weight, and 5 to 30 parts by weight, respectively.

3. The primer composition according to claim 1, wherein the silane compound to be reacted with a polyisocyanate is a silane compound having a mercapto group.

4. The primer composition according to claim 3, wherein the silane compound to be reacted with a polyisocyanate is a compound selected from the group consisting of γ-mercaptopropylmethyldimethoxysilane, γ-mercaptopropyltrimethoxysilane, γ-mercaptopropylmethyldiethoxysilane, γ-mercaptopropyltriethoxysilane, γ-mercaptopropylethyldimethoxysilane, γmercaptopropylethyldiethoxysilane, γ-mercaptopropyldimethylmethoxysilane, β-mercaptoethylmethyldimethoxysilane, β-mercaptoethyltrimethoxysilane, and β-mercaptoethyltriethoxysilane.

* * * * *